United States Patent [19]

Sie

[11] Patent Number: 4,681,701
[45] Date of Patent: Jul. 21, 1987

[54] PROCESS FOR PRODUCING SYNTHESIS GAS

[75] Inventor: Swan T. Sie, Amsterdam, Netherlands

[73] Assignee: Shell Oil Company, Houston, Tex.

[21] Appl. No.: 885,553

[22] Filed: Jul. 14, 1986

[30] Foreign Application Priority Data

Aug. 30, 1985 [GB] United Kingdom ............... 8521608

[51] Int. Cl.$^4$ .............................................. C01B 3/34
[52] U.S. Cl. ................................ 252/373; 48/196 A; 48/214 A
[58] Field of Search ............ 48/196 R, 196 A, 197 R, 48/214 A; 252/373; 423/652, 653, 654

[56] References Cited

U.S. PATENT DOCUMENTS

| | | | |
|---|---|---|---|
| 2,589,810 | 3/1952 | Holcroft | 252/373 |
| 2,660,521 | 11/1953 | Teichmann | 252/373 |
| 3,424,695 | 1/1969 | Wiessenthal | 48/214 A |
| 3,446,747 | 5/1969 | Bongiorno | 48/214 A |

Primary Examiner—Peter Kratz
Attorney, Agent, or Firm—Kimbley L. Muller

[57] ABSTRACT

A process for producing synthesis gas by catalytic reforming of hydrocarbons with steam in a reaction zone which is subjected to heat exchange with a combustion gas and recycling heat exchanged combustion gas to a combustion zone. The invention further relates to an apparatus suitable for said process.

4 Claims, 1 Drawing Figure

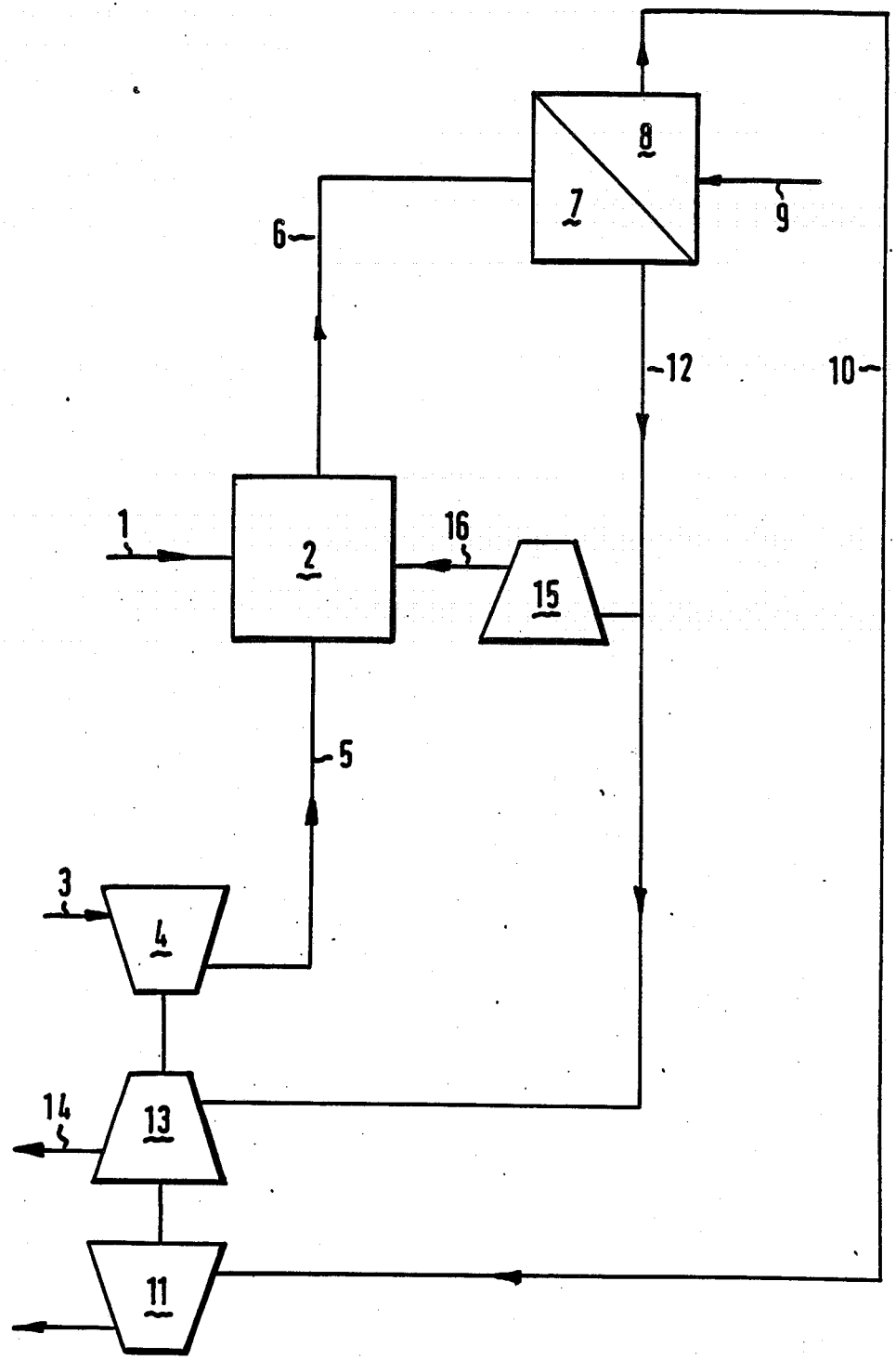

PROCESS FOR PRODUCING SYNTHESIS GAS

FIELD OF THE INVENTION

The invention relates to a process for producing synthesis gas by catalytic reforming of hydrocarbons with steam in a reaction zone and to an apparatus suitable for carrying out such a process.

BACKGROUND OF THE INVENTION

It is well known to produce synthesis gas (which mainly contains carbon monoxide and hydrogen, and in addition unconverted hydrocarbons and steam) by means of reforming e.g. natural gas with steam which may comprise carbon dioxide. The reforming reactions $$CH_4 + H_2O \rightarrow CO + 3H_2$$

$$CH_4 + CO_2 \rightarrow 2CO + 2H_2$$

are highly endothermic; substantial amounts of energy are therefore required to sustain a reforming process and to maintain reactor temperatures at adequate levels. The required energy can either be supplied inside the reaction zone (e.g. by continuously or intermittently allowing an exothermic reaction to take place therein, such as the combustion of hydrocarbons with air) or outside said reaction zone by combustion of fuel in burners which are usually located adjacent to the reforming reaction zone inside a reformer furnace.

In most cases the sensible heat left in combustion gas which has been heat exchanged with the reforming reaction zone is employed for generating and superheating steam which in turn can be advantageously employed in subsequent process steps such as hydrogen production, ammonia- and methanol-synthesis.

However, in some cases the steam requirement of processes in which synthesis gas is used as feed and which are carried out near the reforming unit, is considerably less than the amount of steam produced by using the sensible heat of combustion gas which, after heat exchange with the reaction zone, may still have a temperature of 1000° C. or even 1100° C.

DETAILED DESCRIPTION OF THE INVENTION

It has been proposed to employ part of the energy content of the heat exchanged combustion gas for the compression of air to be supplied to the reformer furnace(s); in addition, it has been proposed to simultaneously compress the synthesis gas produced in the reformer by means of a turbo-expander which drives both an air- and a synthesis-gas compressor.

In a number of processes in which synthesis gas is used as feedstock, however, the amount of compression energy required is relatively low as a result of a moderate pressure difference between the operating pressure of e.g. a hydrocarbon synthesis process and the pressure at which synthesis gas becomes available from the reforming unit.

It would be advantageous to apply at least part of the heat content of the heat exchanged combustion gas in the process for producing synthesis gas proper, without producing excess steam, electricity or compression energy, in order to improve the thermal efficiency of said process.

It has now been found that combustion gas which has been in heat exchange contact with the reforming reaction zone can be advantageously employed by recycling at least part of said gas to the combustion zone.

The invention therefore relates to a process for producing synthesis gas by catalytic reforming of hydrocarbons with steam in a reaction zone which is subjected to heat exchange with a combustion gas, which heat exchanged combustion gas is at least partly recycled to a combustion zone.

A main advantage of recycling combustion gas is that the sensible heat of the recycled gas (which is at a too low temperature level to be useful for the steam reforming reaction) is retained in the reactor system and not lost or recuperated for other uses, as is the case when no recycle is applied. The temperature of the recycled combustion gas is brought back to a useful level for sustaining the reforming reaction in the combustor. Another major advantage of recycling combustion gas is the ability to control the temperature in the combustion zone more accurately by mixing therein relatively large streams of heat exhanged combustion gas with relatively small streams of oxygen-containing gas and fuel; as a result in the combustion zone temperatures can be maintained close to limit set by the applied construction materials. Furthermore, the use of a relatively large stream of combustion gas, including a substantial amount of recycle gas, will result in improved heat transfer of said combustion gas with the reaction zone. In addition, the lower combustion temperatures as compared with combustion of fuels in a conventional burner will result in less emission of nitrogen oxides to the atmosphere.

Moreover, it will be clear that in the process according to the invention less fuel will have to be used in the combustion zone than when all heat exchanged combustion gas is withdrawn from the process itself and used for a different purpose. Accordingly, less oxygen-comprising gas will have to be supplied to the combustion zone; this is particularly relevant when the combustion gas is obtained by reacting a compressed oxygen-comprising gas (preferably air) with a fuel in the combustion zone because a smaller compressor (using less energy) can then be used, compared with the situation in which no combustion gas is recycled. The use of compressed, and thereby preheated, oxygen-comprising gas is preferred in the process according to the invention in order to improve the thermal efficiency of the combustion zone and thus of the total process.

In order to overcome the usually small pressure drop (e.g. in the order of 0.5–5 bar) resulting from the flow of combustion gas through a reformer reactor, at least the heat exchanged combustion gas which is to be recycled to the combustion zone is preferably first compressed to the pressure prevailing in said zone. Alternatively, an ejector-type of combustor can be used when the required pressure increase of the heat exchanged combustion gas is small enough to make it viable; in this case combustion gas is advantageouly recycled directly to the combustion zone.

The combustion zone is preferably spaced apart from the reaction zone, and is most preferably located outside the reforming reactor vessel; this way a smaller vessel can be employed for a given capacity of synthesis gas production and, moreover, the reaction zone will be heated substantially uniformly by combustion gas instead of risking local overheating by a number of burners located near the reaction zone, as in previous reforming processes.

The invention further relates to an apparatus suitable for the production of synthesis gas including a reactor which comprises feed inlet means and product outlet means communicating with heat exchanger reactor internals, and combustion gas in- and outlet means, which apparatus also includes a combustor spaced apart from the reactor and communicating with said combustion gas in- and outlet means.

The reactor internals preferably comprise double concentric tubes with catalyst in the annular space between the tubes. The outer tubes are suitably mounted substantially vertically in a horizontal inlet manifold for hydrocarbon/steam (and, optionally carbon dioxide) feed distribution. The lower ends of the outer tubes are closed in order to reverse the flow of gas having passed downwardly through the annular catalyst bed. The inner tubes into which the product gas is subsequently passed, are suitably connected to a product outlet manifold. Advantageously, the combustion gas (having a temperature of e.g. 900°–1200°C.) enters the reforming reactor below or near the lower ends of the tubular reaction zone and leaves the reactor below the horizontal inlet manifold, which is situated at the relatively cold (e.g. 650°–800° C.) upper part of the reactor. When the concentric tubes are mounted in the above described manner, their hot lower ends can expand freely and thermal expansion in the manifolds is kept to a minimum.

BRIEF DESCRIPTION OF THE DRAWING

The instant drawing is a schematic process flow scheme representative of the broad aspects of this invention.

DETAIL DESCRIPTION OF THE DRAWING

Further aspects of the invention will be discussed with the use of the reference numerals given in the FIGURE wherein, only by way of example, various preferred features of the process according to the invention have been included.

Fuel is introduced through line (1) into combustor (2); in a preferred embodiment of the process according to the invention said fuel is introduced at superatmospheric pressure and may comprise effluent gas from a (heavy) hydrocarbon synthesis unit wherein synthesis gas is used as feed. An oxygen-comprising gas (usually air) stream (3) is compressed in compressor (4) and led through line (5) to combustor (2) from which hot combustion gas flows through line (6) to a section (7) of the reforming reactor. In the reactor heat exchange takes place between hot combustion gas in section (7) and the catalytic reforming section (8) into which a feed stream is introduced through line (9). The feed stream comprises hydrocarbons and steam; preferably, carbon dioxide is also introduced into the reforming section, thus enabling adjustment of the $H_2/CO$ ratio in the reformed gas to values desired for further processing the gas in e.g. a hydrocarbon synthesis unit. In case the reforming unit is coupled with such a hydrocarbon synthesis unit, the feed stream in line (9) preferably also comprises gas (e.g. carbon dioxide, carbon monoxide, hydrogen and/or $C_1$–$C_4$ hydrocarbons) which is separated from the desired products (e.g. hydrocarbons with 5 or more carbon atoms per molecule) of the hydrocarbon synthesis unit.

Synthesis gas emanating from the reforming section (8) is suitably led through line (10) to compressor (11) to be compressed to the desired, or in some cases the maximum attainable, pressure. Of course, compressor (11) can be omitted e.g. when the pressure of the synthesis gas in line (10) is sufficient for further processing, or when insufficient power is available for compressing both the oxygen-comprising gas stream (3) and the synthesis gas. Said power is suitably generated by expanding a part of the heat exchanged combustion gas stream (12) in turbo-expander (13). Excess power from the turbo-expander, not required for the above mentioned purposes, can be suitably applied for compressing heat exchanged combustion gas, by coupling turbo-expander (13) directly with compressor (15) or with an electric generator (not shown in the FIGURE; preferably a motor/generator which can be used also during start-up of the process according to the invention) delivering electric power to a motor (not shown) which drives compressor (15).

The heat exchanged combustion gas is preferably recycled to the combustor (2) (after compression) through line (16) at a temperature from 600°–850° C., preferably from 650°–800° C., and a pressure from 5–30 bar, preferably from 10–20 bar.

Combustor (2), turbo-expander (13) and compressor (4) (and/or other compressors) may be combined in one apparatus, i.e. a gas turbine, for compact construction of the reforming apparatus according to the present invention, which is desirable for e.g. offshore use.

ILLUSTRATIVE EMBODIMENT

The invention is further illustrated by the following Example.

In a process set-up as depicted in the FIGURE a feed stream comprising 930 tons/day of methane, 2,790 tons/day of steam and 870 tons/day of carbon dioxide is introduced through line (9) at a temperature of 475° C. and a pressure of 15 bars (abs.) into the catalytic reforming section (8) wherein the feed is contacted with a catalyst comprising nickel on alumina as carrier and converted to synthesis gas which after exchanging heat with the incoming feed leaves the reforming section through line (10) at a temperature of 650° C. and a pressure of 13 bar (abs.). In combustor (2) 27,530 tons/day of combustion gas recycled at a temperature of 750° C. and a pressure of 15 bar (abs.) through line (16) is reheated and mixed with the combustion products of 141 tons/day of hydrogen as fuel gas and 5.070 tons/day of atmospheric air compressed to a pressure of 15 bar (abs.) at a temperature of 425° C., supplied through lines (1) and (16), respectively. The resulting combustion gas enters section (7) of the reforming reactor at a temperature of 1030° C. and a pressure of 15 bar (abs.) and is subsequently cooled off to a temperature of 730° C. by heat exchange with reforming section (8). 5,211 tons/day of heat exchanged combustion gas is expanded to atmospheric pressure and exits turbo-expander (13) at a temperature of 300° C.

Accordingly, 84% of the heat exchanged combustion gas, (27,530 tons/day of a total of 32,741 tons/day), as described hereinbefore, is recycled to the combustor instead of being used for steam generation or compression purposes, as in prior art processes.

I claim as my invention:

1. A process for producing synthesis gas by reforming hydrocarbons with steam in a reforming reaction zone equipped with heat exchange means which comprises:
   (a) passing an oxygen-containing gas to a compression zone wherein said oxygen-containing gas is compressed and passed to a combustion zone;

(b) combusting said compressed gas with a fuel in said combustion zone to form a hot combustion gas effluent stream;

(c) passing said hot combustion gas effluent stream to a reforming zone wherein a hydrocarbon feed stream is reformed during which heat exchange takes place between said hot combustion gas effluent stream and said reformer zone to produce a synthesis gas withdrawn from said reformer zone and to form a reformer zone heat exchanged combustion gas;

(d) passing at least a portion of said heat exchanged combustion gas to a turbo-expander and generating power which is used to compress said oxygen-containing gas in step (a); and (e) compressing at least another portion of said heat exchanged combustion gas and recycling said compressed heat exchanged combustion gas to said combustion zone of step (b).

2. The process of claim 1 wherein said synthesis gas derived from reforming reaction zone is compressed by use of power generated by expanding said portion of said heat exchanged combustion gas in step (d).

3. The process of claim 1 wherein said compressed heat exchanged combustion gas of step (e) recycled to step (b) is at a temperature of form 600°–850° C. and a pressure of from 5–30 bar.

4. The process of claim 1 wherein said compressed heat exchanged combustion gas of step (e) recycled to step (b) is at a temperature of from 650°–800° C. and a pressure of from 10–20 bar.

* * * * *